(12) United States Patent
Li

(10) Patent No.: US 8,345,889 B2
(45) Date of Patent: Jan. 1, 2013

(54) WIRELESS TRANSMISSION-AV SYSTEM OF OUTDOOR FURNITURE

(75) Inventor: Wanda Ying Li, Santa Ana, CA (US)

(73) Assignee: Oliver Joen-An Ma, Arcadia, CA (US)

( * ) Notice: Subject to any disclaimer, the term of this patent is extended or adjusted under 35 U.S.C. 154(b) by 847 days.

(21) Appl. No.: 12/150,708

(22) Filed: Apr. 29, 2008

(65) Prior Publication Data

US 2009/0268923 A1    Oct. 29, 2009

(51) Int. Cl.
*H04B 3/00* (2006.01)

(52) U.S. Cl. .......................................... 381/77
(58) Field of Classification Search ...................... 381/77
See application file for complete search history.

(56) References Cited

U.S. PATENT DOCUMENTS

| | | | |
|---|---|---|---|
| 2008/0262657 A1* | 10/2008 | Howell et al. | 700/275 |
| 2009/0193578 A1* | 8/2009 | Jang et al. | 5/1 |
| 2009/0250982 A1* | 10/2009 | Cohen | 297/217.4 |
| 2010/0097441 A1* | 4/2010 | Trachtenberg et al. | 348/14.08 |
| 2010/0320819 A1* | 12/2010 | Cohen et al. | 297/217.4 |

* cited by examiner

*Primary Examiner* — Thao P. Le
(74) *Attorney, Agent, or Firm* — Raymond Y. Chan; David and Raymond Patent Firm

(57) ABSTRACT

A wireless transmission-AV system for an outdoor furniture includes a speaker unit built-in with a furniture frame and a wireless control electrically connected to the speaker unit for wirelessly linking an AV player with the speaker unit, wherein the wireless control has a wireless range covering an area of the furniture frame in such a manner that the speaker unit is adapted for generating an audio signal wirelessly transmitted from the AV player through the wireless control when the AV player is located within the wireless range. Therefore, the user is able to wirelessly link his own AV player to the wireless transmission-AV system to listen to his own music.

20 Claims, 5 Drawing Sheets

WIRELESS TRANSMISSION-AV SYSTEM OF OUTDOOR FURNITURE

BACKGROUND OF THE PRESENT INVENTION

The present invention relates to outdoor furniture, and more particularly to a wireless transmission-AV system for outdoor furniture which comprises a wireless control for providing wireless range effective within an area of the outdoor furniture to enhance the enjoyment therewithin.

FIELD OF INVENTION

Description of Related Arts

Outdoors furniture is set up in many places such as in beach areas, in patio areas, in campsites or in domestic gardens etc. They are usually used for shading sunlight in the daytime and do some entertainment thing such as BBQ event, show exhibition, and so on. Users would always like to listen to the music at their leisure such that the users usually carry a portable music player. However, an additional speaker must be carried to plug to the portable music player for sharing the music to the people. In addition, it is a hassle for people to carry the audio system and mount the audio system to on the outdoor furniture. In other words, most of the users prefer the outdoor furniture with built-in audio system. Although different kinds of outdoor furniture being design by inventor with built-in audio system, there still exist several disadvantages for conventional outdoor furniture.

First, the music of the conventional outdoor furniture is not suitable for everyone's need. People prefer to listen to different kinds of music in different situation. For example, during the night time, people like to listen to smooth music like jazz. In the other hand, the younger and the older have different preference in music. To sum up, the outdoor furniture which is capable of broadcast different kinds of music to fit different people's need is touching the user's heart and become a trend for outdoor furniture with speaker.

Second, because the volume of the music for the outdoor furniture cannot be adjusted, it is not convenient for people to use. Though some outdoor furniture have its own speaker unit, in some occasion, owing that the controller is not located at a hand-reachable distance of the furniture, it is hard for people to adjust the volume. Moreover, some speaker unit is directly mounted on the outdoor furniture; it's not good for outside looking.

SUMMARY OF THE PRESENT INVENTION

A main object of the present invention is to provide a wireless transmission-AV system for outdoor furniture, wherein the outdoor furniture comprises a wireless control which is capable of providing wireless range effective within an area of the outdoor furniture frame.

Another object of the present invention is to provide a wireless transmission-AV system for outdoor furniture, wherein the speaker unit comprises one or more speakers built-in with the furniture frame and an operation unit so as to protect the mechanical apparatus of the speakers and improve the appearance of the outdoor furniture.

Another object of the present invention is to provide a wireless transmission-AV system for outdoor furniture, wherein a wireless connectivity of the wireless control is selected from the group consisting of "Bluetooth" connectivity, Infrared connectivity, and Radio Frequency connectivity such that the able is able to transmit the audio single via greater diversity and choice wireless transmission.

Another object of the present invention is to provide a wireless transmission-AV system for outdoor furniture, wherein the wireless control comprises a manual activator electrically linked to the wireless receiver to manually activate the wireless receiver for wirelessly linking with the AV player within the wireless range such that the user is able to turn on and off the manual activator by manual. It not only saves the electricity consuming for the wireless transmission, but also extends the life span of the mechanical device.

Another object of the present invention is to provide a wireless transmission-AV system for outdoor furniture, wherein the wireless control further comprises a wireless deactivator electrically linked to the wireless receiver to automatically disconnect a wireless connection between the speaker unit and the AV player so as to keep each of the awning frame still has their own music and doesn't interface to each other.

Accordingly, in order to accomplish the above objects, the present invention provides a wireless transmission-AV system for outdoor furniture, comprising:

a speaker unit built-in with a furniture frame of the outdoor furniture; and a wireless control electrically connected to the speaker unit for wirelessly linking an AV player with the speaker unit. The wireless control further comprises a wireless receiver electrically connected to the speaker unit and being activated for detecting a presence of the AV player within the wireless range.

These and other objectives, features, and advantages of the present invention will become apparent from the following detailed description, the accompanying drawings, and the appended claims.

BRIEF DESCRIPTION OF THE DRAWINGS

FIG. 1 is a perspective view of an outdoor furniture with a wireless transmission-AV system according to a preferred embodiment of the present invention.

FIG. 2 is a block diagram of the outdoor furniture with a wireless transmission-AV system according to the above preferred embodiment of the present invention.

FIG. 3 illustrates an alternative mode of the outdoor furniture with the wireless transmission-AV system according to the above preferred embodiment of the present invention, illustrating the outdoor furniture embodied as an outdoor patio chair.

FIG. 4 illustrates another alternative mode of the outdoor furniture with the wireless transmission-AV system according to the above preferred embodiment of the present invention, illustrating the outdoor furniture embodied as an outdoor patio table.

FIG. 5 illustrates another alternative mode of the outdoor furniture with the wireless transmission-AV system according to the above preferred embodiment of the present invention, illustrating the outdoor furniture contributing a wireless transmission network.

DETAILED DESCRIPTION OF THE PREFERRED EMBODIMENT

Referring to FIGS. 1 and 2 of the drawings, an outdoor furniture according to a preferred embodiment of the present invention is illustrated, wherein the outdoor furniture comprises a furniture frame 10 and a wireless transmission-AV system 20.

The furniture frame 10 according to the preferred embodiment is an outdoor umbrella which comprises an awning frame 11 and an awning shade 12 supported by the awning frame 11 to define a shading area under the awning shade 12. Alternatively, the furniture frame 10 can be a canopy, an outdoor patio chair, or an outdoor patio table.

Figure 1:
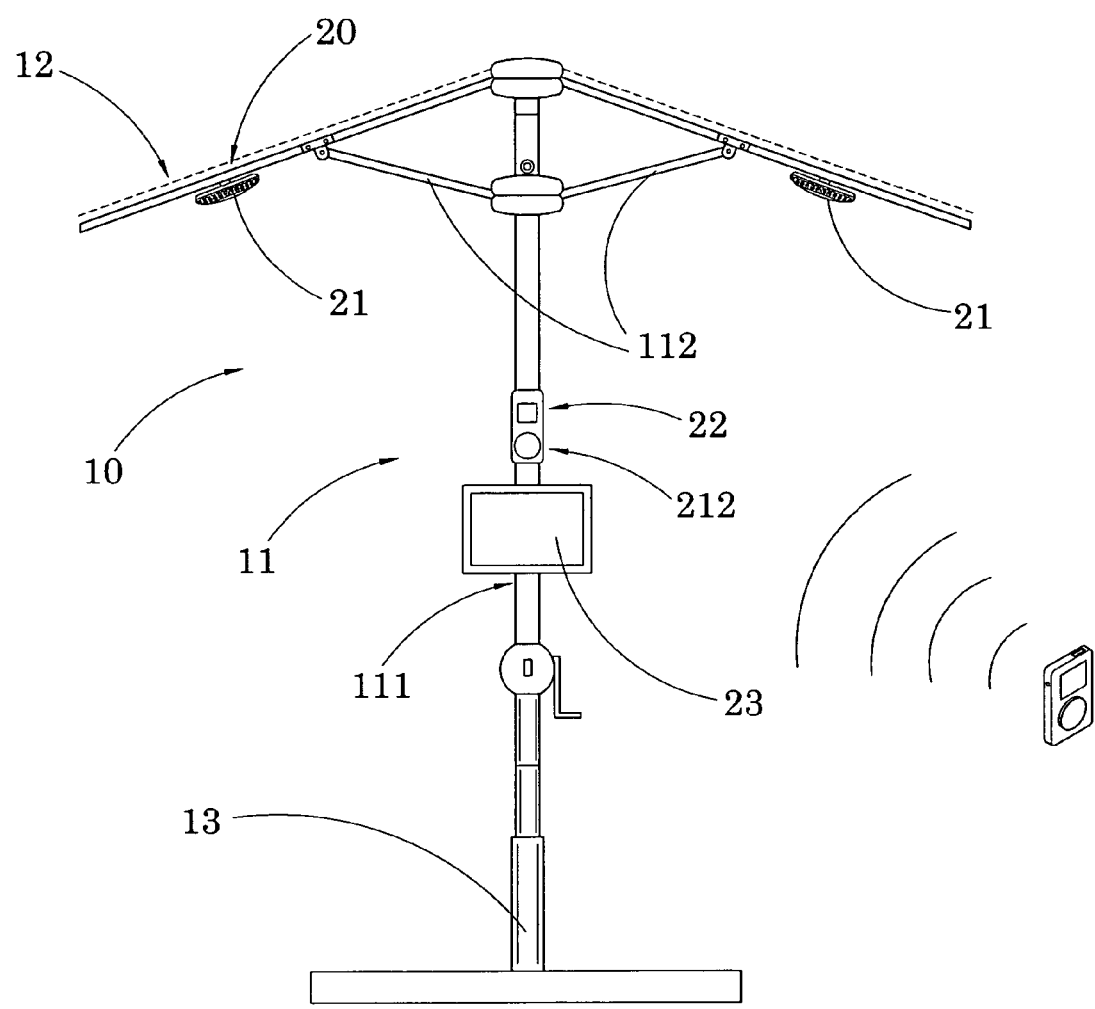

As shown in FIG. 1, the awning frame 11 comprises a supporting shaft 111 and a sunshading frame 112 suspendedly supported by the supporting shaft 111, wherein the awning shade 12, which is preferred made of fabric having a sun-shading ability and UV blocking ability, is supported by the sunshading frame 112. Therefore, when the user is located within the shading area of the furniture frame 10, the awning shade 12 provides a shade to reduce exposure to the sun's UV rays and heat. In addition, a power supply 13 is supported by the furniture frame 10 and is electrically connected to the wireless transmission-AV system 20.

According to the preferred embodiment, the wireless transmission-AV system 20 comprises an output device supported by the furniture frame 10 and a wireless control 22 electrically connected to the output device for wirelessly linking an AV player with the output device. The AV player can be an AV player or an audio-video player for generating an AV signal. The wireless control 22 has a wireless range covering a functional area of the furniture frame 10 in such a manner that the output device is adapted for generating the output signal wirelessly transmitted from the AV player through the wireless control 22 when the AV player is located within the wireless range.

The output device comprises a speaker unit 21 and a display unit 23. The speaker unit 21 electrically link with the wireless control 22 for generating an audio signal as the output signal wirelessly transmitted from the AV player through the wireless control 22 when the AV player is located within the wireless range. The display unit 23 is electrically link with the wireless control 22 to operatively connect to the speaker unit 21, wherein the display unit 23 is adapted for generating a video signal as the output signal wirelessly transmitted from the AV player through the wireless control 22 when the AV player is located within the wireless range. As it is mentioned above, when the AV player is an audio player, the audio signal is wirelessly transmitted to the speaker unit 21. When the AV player is an audio-video player, the audio and video signals are wirelessly transmitted to the speaker unit 21 and the display unit 23 respectively.

The display unit 23 comprises a LED screen for displaying the video signal wirelessly transmitted from the AV player. As shown in FIG. 1, the display unit 23 is adjustably mounted at the shaft of the outdoor umbrella such that the user is able to selectively adjust the eye level of the display unit 23 with respect to the ground. It is worth to mention that the speaker unit 21 can be built-in with display unit 23 as an integrated module such that the video and audio signal from the AV player can be wirelessly transmitted to the output unit at the same time instead of individually transmitting to the speaker unit 21 and the displayer unit 23.

In view of the outdoor umbrella, the wireless range of the wireless control 22 should cover the shading area of the furniture frame 10 as the functional area thereof in such a manner that when the AV player is located within the shading area of the furniture frame 10, the wireless control 22 is adapted to wirelessly linked to the AV player for wirelessly transmitting the output signal from the AV player to the speaker unit 21 and/or the display unit 23 of the output unit for music and/or video broadcasting. Accordingly, the functional area of the outdoor patio is the sitting area thereof.

Accordingly, the speaker unit 21 comprises one or more speakers 211 built-in with the furniture frame 11 and an operation unit 212 which is located at a hand-reachable distance of the furniture frame 10 and is operatively connected to the speakers 211 to adjustably control a sound setting of the speakers 211.

The speakers 211 are spacedly mounted at the sunshading frame 112 of the furniture frame 11 and are electrically connected to the power supply 13 of the outdoor furniture. The power supply 13 can be an AC adapter for electrically connecting with an external AC terminal or a solar energy collector converting solar energy into electrical energy. It is worth to mention that the speakers 211 are spacedly built-in with the sunshading frame 112 underneath the awning shade 12 such that the user is able to listen to the music through the speakers 211 anywhere within the shading area.

The operation unit 212 is preferably mounted at the supporting shaft 111 of the furniture frame 10 such that the user is able to reach the operation unit 212. Accordingly, the operation unit 212 is a control panel for controlling the speakers 211 such that the operation unit 212 is adapted to control the volume and the sound effect of the speakers 211. It is worth to mention that the speaker unit 21 is electrically pre-wired with the furniture frame 10.

The wireless control 22 comprises a wireless receiver 221 electrically connected to the speaker unit 21 and/or the display unit 23 of the output unit and being activated for detecting a presence of the AV player within the wireless range to establish a wireless link between the AV player and the speaker unit 21 and/or the display unit 23 of the output unit so as to wirelessly transmit the output signal from the AV player to the speaker unit 21 and/or the display unit 23 of the output unit. Accordingly, when the user brings his or her own AV player within the wireless range of the wireless control 22, the wireless receiver 221 will be automatically or manually detected the presence of the AV player. Therefore, once the wireless link is established, the wireless receiver 221 will wirelessly receive the audio/video signal from the AV player and will send the audio signal to the speaker unit 21 and/or the display unit 23 of the output unit.

According to the preferred embodiment, the wireless connectivity of the wireless control 22 is selected from the group consisting of "Bluetooth" connectivity, Infrared connectivity, and Radio Frequency connectivity. Accordingly, the wireless control 22 can only wirelessly link to one AV player at one time. In other words, the wireless control 22 cannot wirelessly link to two or more AV players at the same time.

When the AV player has the compatible wireless connectivity, the wireless control 22 is capable of wirelessly connecting with the AV player. For example, if the AV player has a built-in "Bluetooth" connecting function, the wireless control 22 is adapted to pair with the AV player to transmit the audio signal from the AV player to the speaker unit 21 and/or the display unit 23 of the output unit. It is worth to mention that the wireless range of the wireless control 22 is preset with a limited range for preventing the interference of the wireless link.

If the AV player does not contain the compatible wireless connectivity, the wireless control 22 may not capable of wirelessly connecting with the AV player. In order to wirelessly link the wireless control 22 with such incompatible AV player, the wireless control 22 further comprises a wireless transmitter 222 which is wirelessly paired with the wireless receiver 221 and is adapted for detachably connecting to the AV player to wirelessly transmitting the output signal from the AV player to the speaker unit 21 and/or the display unit 23 of the output unit. The wireless transmitter 22 is adapted to connect with the AV player to establish the wireless link between the wireless control 22 and the AV player.

When the wireless control 22 and the AV player is wirelessly linked through the Radio Frequency connectivity, the wireless receiver 221 and the wireless transmitter 222 are the FM receiver and FM receiver respectively. Accordingly, the wireless transmitter 222 can be automatically or manually tuned to match the radio frequency of the wireless receiver 221 to establish the wireless link between the wireless control 22 and the AV player. In addition, two different outdoor furniture can be set up to wirelessly link to two AV players by using different radio frequencies respectively. Therefore, the wireless control 22 of one of the outdoor furniture will not be interfered with the wireless control 22 of the neighboring outdoor furniture.

As it is mentioned above, the wireless link between the wireless control 22 and the AV player can be established automatically or manually. Preferably, it should be set up by manual for security purpose. Accordingly, the wireless control 22 further comprises a manual activator 223 electrically linked to the wireless receiver 221 to manually activate the wireless receiver 221 for wirelessly linking with the AV player within the wireless range. The user is able to manually activate the wireless receiver 221 via the manual activator 223 to establish the wireless link between the wireless control 22 and the AV player. Since two or more AV players may be located within the wireless range of the wireless control 22, the user is able to manually select the particular AV player to be wirelessly linked with the wireless receiver 221.

Figure 2:
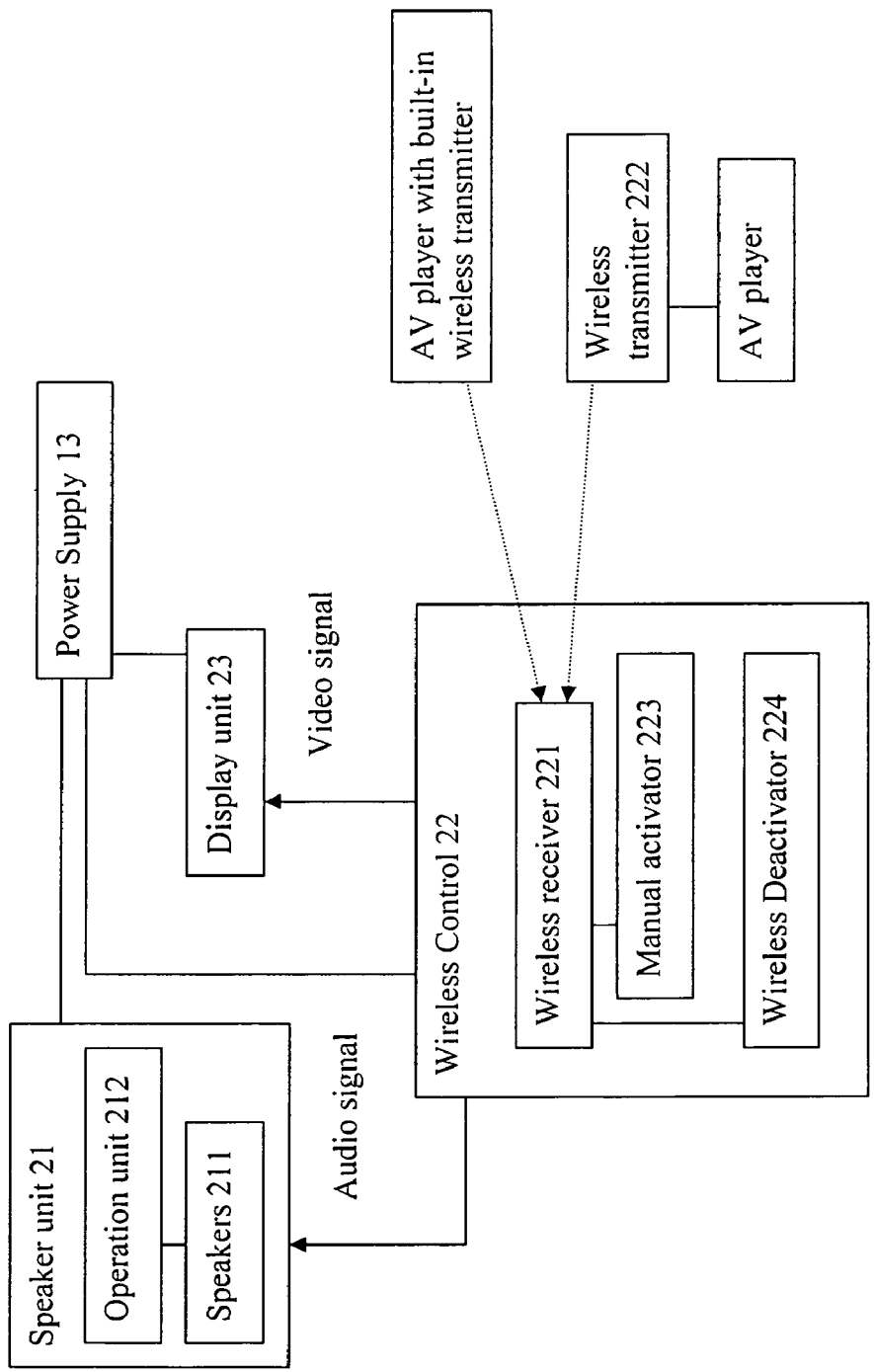

As shown in FIG. 2, the wireless control 22 further comprises a wireless deactivator 224 electrically linked to the wireless receiver 221 to automatically disconnect a wireless connection between the speaker unit 21 and the AV player in condition that the AV player is out of the wireless range and the wireless deactivator 224 is manually triggered to deactivate the wireless receiver 221.

Accordingly, once the AV player is located out of the wireless range, the wireless link between the wireless control 22 and the AV player will be automatically disconnected. The wireless control 22 will be set as its initial setting such that the AV player must be wirelessly re-connected with the wireless control 22. It is important that when the user has left the outdoor furniture, especially for the outdoor furniture in the public area, the wireless link between the wireless control 22 and the AV player will be automatically disconnected. Therefore, another user is able to wirelessly link his or her AV player to the wireless control 22.

In other condition, the user is able to manually deactivate the wireless receiver 221 via the wireless deactivator 224 to cut off the wireless link between the wireless control 22 and the AV player. Once the wireless link is cut off, the wireless control 22 is adapted to wirelessly re-connect with the same AV player again or to wirelessly connect with another AV player via the manual activator 223.

Accordingly, the AV player is preferred to be embodied as a mobile phone with built-in music player and "Bluetooth" connection capability. Since most people nowadays have the mobile phone, they can wirelessly link their mobile phones to the wireless transmission-AV system 20 for music broadcasting. Especially when the user invites friends to his or her house for outdoor activities, his or her friends are able to share the music by wirelessly connecting their mobile phone with the wireless transmission-AV system 20. In addition, most of the public beaches provide free or rental outdoor umbrellas for people to use. They can simply wirelessly connect the corresponding outdoor umbrella within the wireless range to enjoy their own music.

Figure 3:
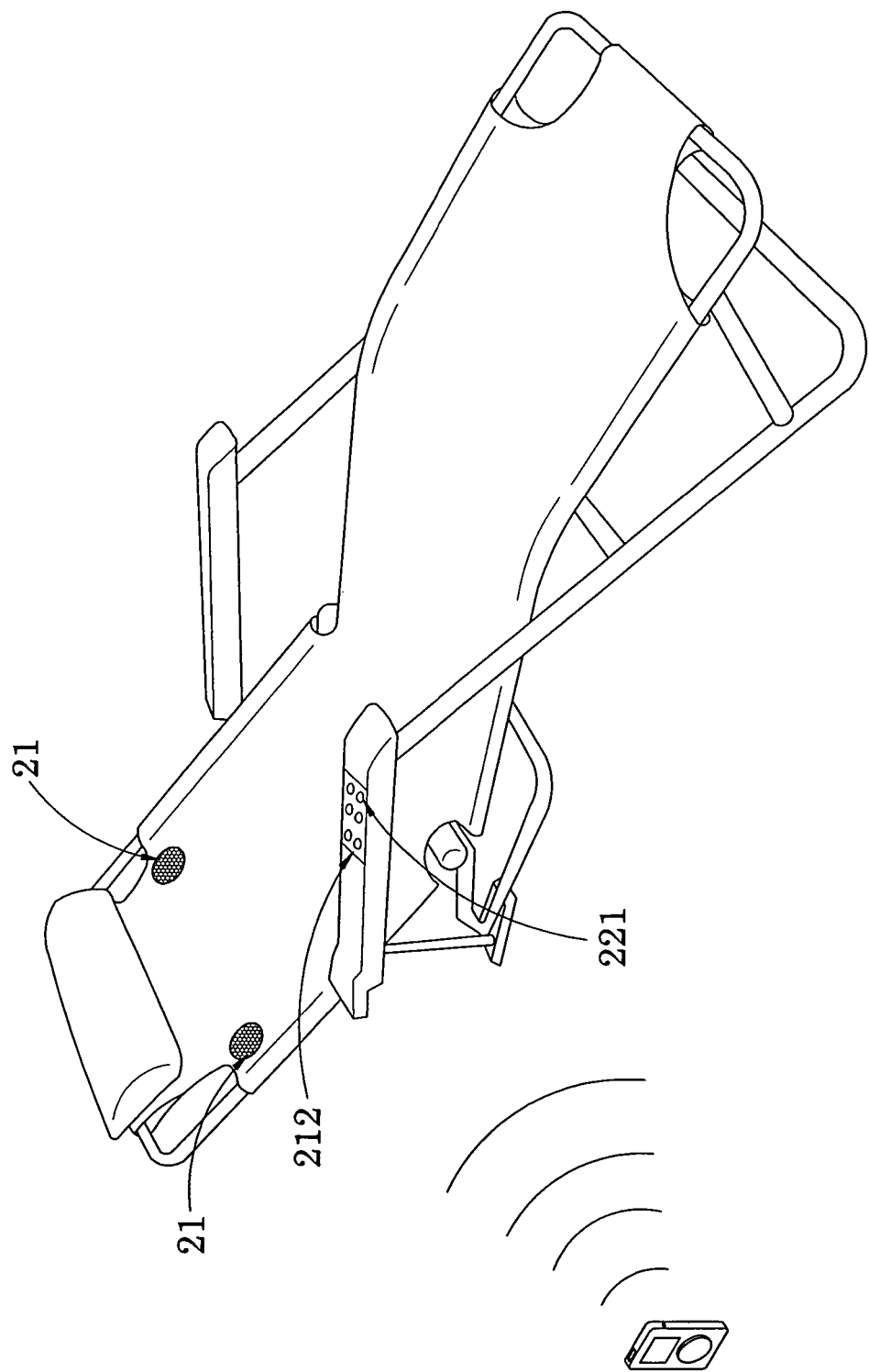
Figure 4:
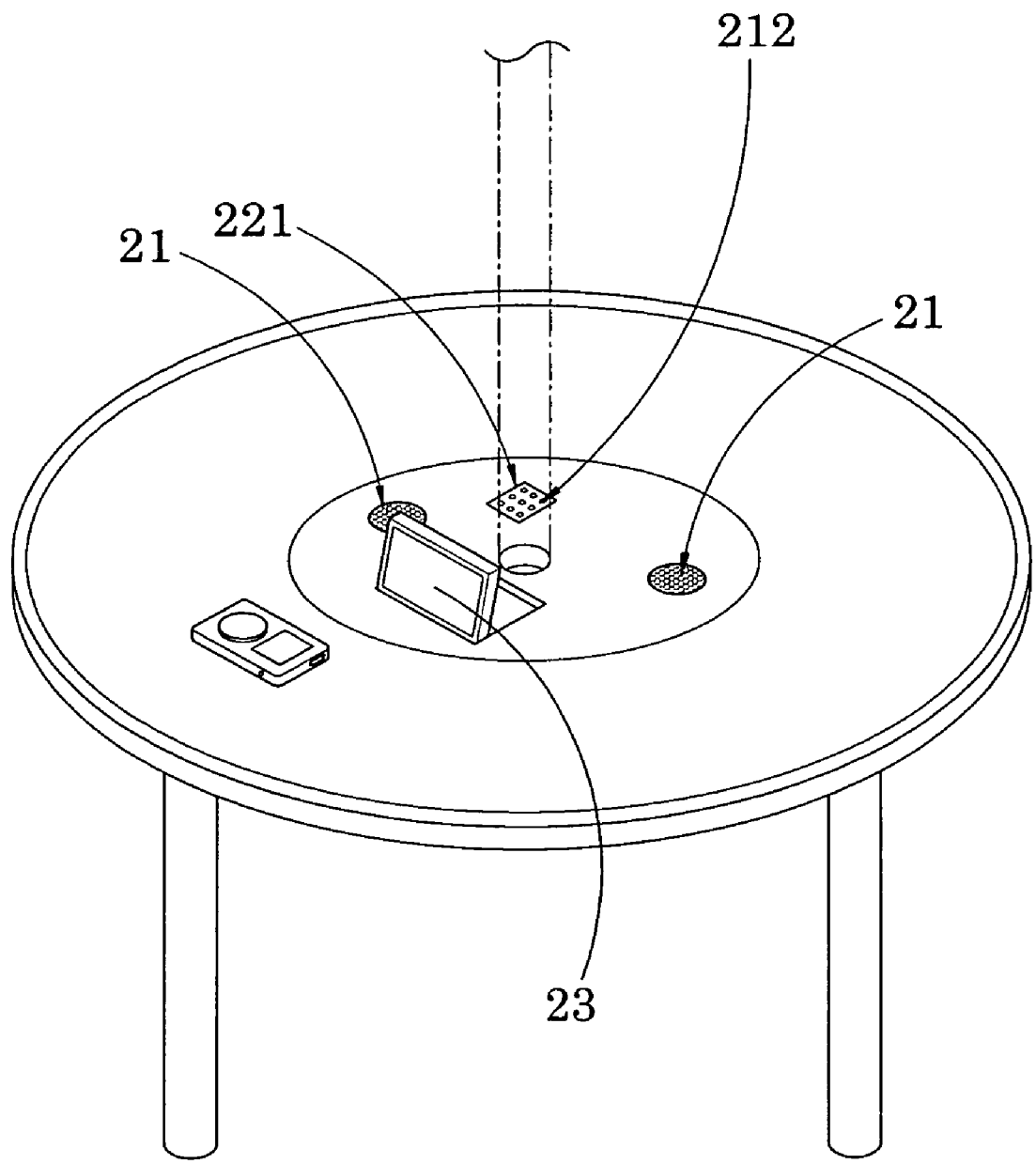

Likewise, the outdoor patio chairs or outdoor beach chairs are one of the best outdoor furniture to built-in with the wireless transmission-AV system 20, wherein the speaker unit 21 can be built-in at the back support of the chair while the wireless control 22 can be built-in at the arm rest of the chair, as shown in FIG. 3, such that the user is able to sit on the chair to enjoy the sunbathing and to listen to the own music at the same time. In addition, the wireless transmission-AV system 20 of the present invention can be built-in with the outdoor patio table, as shown in FIG. 4, wherein the speaker unit 21 and the wireless control 22 can be built-in on the center portion of the tabletop of the outdoor patio table. Accordingly, the outdoor umbrella can be mounted at the outdoor patio table such the people can use the outdoor patio table in purpose of eating a meal outdoors while enjoying their own music at the same time.

Figure 5:
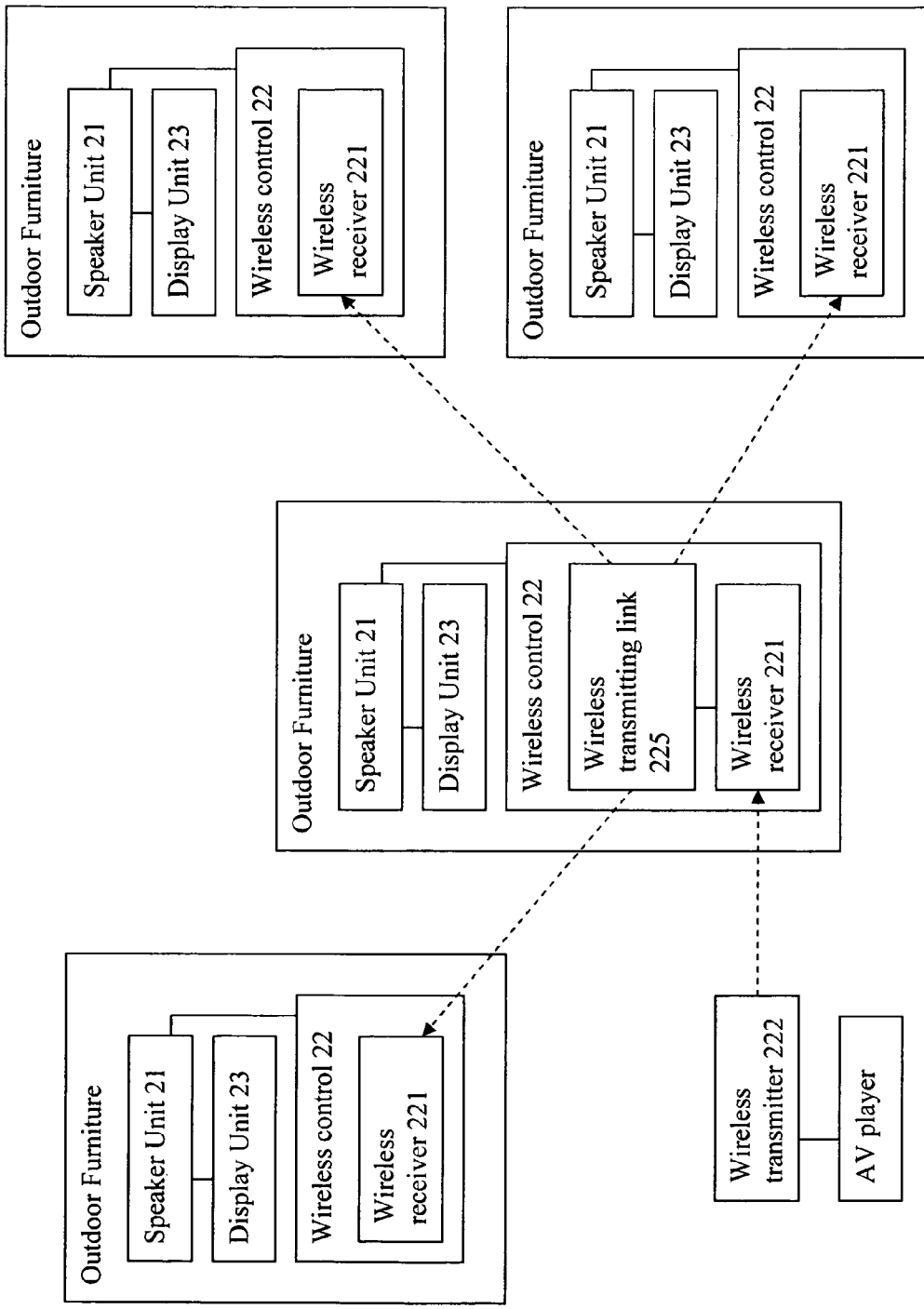

As shown in FIG. 5, the wireless transmission-AV system 20 of one outdoor furniture is adapted to wirelessly network with the wireless transmission-AV system 20 of another outdoor furniture to contribute a wireless transmission network. In other words, when two or more outdoor furniture are located at different locations having a predetermined wireless range between each other, the wireless transmission-AV systems 20 are adapted to wireless link with each other, preferably by "BlueTooth" connectivity, Infrared connectivity, or Radio Frequency connectivity.

As shown in FIG. 5, one of the outdoor furniture is set as a network center, wherein the wireless control 22 further comprises a wireless transmitting link 225 wirelessly linked with the wireless receiver 221 of another wireless transmission-AV systems 20 to form the wireless transmission network.

The wireless transmission-AV system 20 which further comprises an AV device 24 communicatively linked to the wireless transmitting link 225 adapted for outputting an audio signal and/or video signal, wherein the signal is then wirelessly transmitted to the wireless receiver 221 of another wireless transmission-AV systems 20. Accordingly, the AV device 24 comprises an auxiliary input for communicatively connecting to a portable AV player to receive the audio signal and/or video signal therefrom, and a radio broadcasting circuit for receiving radio wave as the audio signal.

Therefore, when two or more wireless transmission-AV systems 20 are wirelessly networked with each other, one of the wireless transmission-AV systems 20 forms the network center to wirelessly contribute the audio signal and/or video signal to other wireless transmission-AV systems 20. As it is mentioned above, when the user brings his or her own AV player within the wireless range of the wireless control 22, the wireless receiver 221 will wirelessly receive the audio signal from the AV player and will send the audio/video signal to the speaker unit 21 and/or the display unit 23 of the output unit. At the same time, the wireless transmitting link 225 will also send the audio/video signal to the other wireless control 22.

In other words, when the beach chairs are used by a group of friends and are wirelessly networked with each other, the whole group of friends can enjoy the music by linking one AV player with one of the wireless transmission-AV systems 20 at the corresponding beach chair. It is worth to mention that only one of the outdoor furniture, set as the network center, requires the wireless transmitting link 224 as an additional component, while the rest of the outdoor furniture will only require the speaker unit 21 and/or the display unit 23.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An outdoor furniture for incorporating with a portable AV player carried by a user, comprising:
a furniture frame; and a wireless transmission-AV system, which comprises: an output unit supported by said furniture frame; and
a wireless control electrically connected to said output unit for wirelessly linking said portable AV player with said output unit, wherein said wireless control has a wireless range covering a functional area of said furniture frame, wherein said wireless control is arranged for wirelessly linking with said portable AV player within said wireless range, wherein said output unit is adapted for generating an output signal wirelessly transmitted from said portable AV player through said wireless control when said portable AV player is located within said wireless range.

2. The outdoor furniture, as recited in claim 1, wherein said output unit comprises a speaker unit for receiving an audio signal as said output signal of said portable AV player, wherein said speaker unit comprises one or more speakers built-in with said furniture frame and an operation unit which is located at a hand-reachable distance of said furniture frame and is operatively connected to said speakers to adjustably control a sound setting of said speakers.

3. The outdoor furniture, as recited in claim 1, wherein said wireless control comprises a wireless receiver electrically connected to said output unit and being activated for detecting a presence of said portable AV player within said wireless range to establish a wireless link between said portable AV player and said output unit so as to wirelessly transmit said audio signal from said portable AV player to said output unit.

4. The outdoor furniture, as recited in claim 2, wherein said wireless control comprises a wireless receiver electrically connected to said output unit and being activated for detecting a presence of said portable AV player within said wireless range to establish a wireless link between said portable AV player and said output unit so as to wirelessly transmit said audio signal from said portable AV player to said output unit.

5. The outdoor furniture, as recited in claim 3, wherein said wireless control further comprises a wireless transmitter which is wirelessly paired with said wireless receiver and is adapted for detachably connecting to said portable AV player to wirelessly transmitting said audio signal from said portable AV player to said output unit.

6. The outdoor furniture, as recited in claim 4, wherein said wireless control further comprises a wireless transmitter which is wirelessly paired with said wireless receiver and is adapted for detachably connecting to said portable AV player to wirelessly transmitting said audio signal from said portable AV player to said output unit.

7. The outdoor furniture, as recited in claim 1, wherein a wireless connectivity of said wireless control is selected from the group consisting of "Bluetooth" connectivity, Infrared connectivity, and Radio Frequency connectivity for wirelessly linking said output unit with said portable AV player.

8. The outdoor furniture, as recited in claim 4, wherein a wireless connectivity of said wireless control is selected from the group consisting of "Bluetooth" connectivity, Infrared connectivity, and Radio Frequency connectivity for wirelessly linking said output unit with said portable AV player.

9. The outdoor furniture, as recited in claim 6, wherein a wireless connectivity of said wireless control is selected from the group consisting of "Bluetooth" connectivity, Infrared connectivity, and Radio Frequency connectivity for wirelessly linking said output unit with said portable AV player.

10. The outdoor furniture, as recited in claim 3, wherein said wireless control further comprises a manual activator electrically linked to said wireless receiver to manually activate said wireless receiver for wirelessly linking with said portable AV player within said wireless range.

11. The outdoor furniture, as recited in claim 4, wherein said wireless control further comprises a manual activator electrically linked to said wireless receiver to manually activate said wireless receiver for wirelessly linking with said portable AV player within said wireless range.

12. The outdoor furniture, as recited in claim 9, wherein said wireless control further comprises a manual activator electrically linked to said wireless receiver to manually activate said wireless receiver for wirelessly linking with said portable AV player within said wireless range.

13. The outdoor furniture, as recited in claim 10, wherein said wireless control further comprises a wireless deactivator electrically linked to said wireless receiver to automatically disconnect a wireless connection between said output unit and said portable AV player in condition that said portable AV player is out of said wireless range and said wireless deactivator is manually triggered to deactivate said wireless receiver.

14. The outdoor furniture, as recited in claim 11, wherein said wireless control further comprises a wireless deactivator electrically linked to said wireless receiver to automatically disconnect a wireless connection between said output unit and said portable AV player in condition that said portable AV player is out of said wireless range and said wireless deactivator is manually triggered to deactivate said wireless receiver.

15. The outdoor furniture, as recited in claim 12, wherein said wireless control further comprises a wireless deactivator electrically linked to said wireless receiver to automatically disconnect a wireless connection between said output unit and said portable AV player in condition that said portable AV player is out of said wireless range and said wireless deactivator is manually triggered to deactivate said wireless receiver.

16. The outdoor furniture, as recited in claim 1, wherein said furniture frame comprises an awning frame and an awning shade supported by said awning frame to define a shading area under said awning shade, wherein said output unit is supported by said awning frame, wherein said wireless range of said wireless control covers said shading area of said furniture frame.

17. The outdoor furniture, as recited in claim 4, wherein said furniture frame comprises an awning frame and an awning shade supported by said awning frame to define a shading area under said awning shade, wherein said output unit is supported by said awning frame, wherein said wireless range of said wireless control covers said shading area of said furniture frame.

18. The outdoor furniture, as recited in claim 15, wherein said furniture frame comprises an awning frame and an awning shade supported by said awning frame to define a shading area under said awning shade, wherein said output unit is supported by said awning frame, wherein said wireless range of said wireless control covers said shading area of said furniture frame.

19. The outdoor furniture, as recited in claim 4, further comprising a power supply which is supported by said furniture frame and is electrically connected to said wireless control, wherein said power supply comprises a solar energy collector.

20. The outdoor furniture, as recited in claim 18, further comprising a power supply which is supported by said furniture frame and is electrically connected to said wireless control, wherein said power supply comprises a solar energy collector.

* * * * *